United States Patent
Iijima et al.

(10) Patent No.: US 11,220,180 B2
(45) Date of Patent: Jan. 11, 2022

(54) AUTONOMOUS DRIVING APPARATUS AND NAVIGATION APPARATUS

(71) Applicant: TOYOTA JIDOSHA KABUSHIKI KAISHA, Toyota (JP)

(72) Inventors: Akira Iijima, Nagoya (JP); Hiroaki Sakakibara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 16/592,950

(22) Filed: Oct. 4, 2019

(65) Prior Publication Data
US 2020/0148059 A1    May 14, 2020

(30) Foreign Application Priority Data
Nov. 14, 2018    (JP) .............................. JP2018-214084

(51) Int. Cl.
| | |
|---|---|
| *G01C 21/00* | (2006.01) |
| *B60K 35/00* | (2006.01) |
| *G01C 21/36* | (2006.01) |
| *G05D 1/00* | (2006.01) |

(52) U.S. Cl.
CPC .......... *B60K 35/00* (2013.01); *G01C 21/3629* (2013.01); *G01C 21/3655* (2013.01); *B60K 2370/00* (2019.05); *B60K 2370/1529* (2019.05); *B60K 2370/1575* (2019.05); *B60K 2370/166* (2019.05); *G01C 21/3658* (2013.01); *G05D 1/0088* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 2015/0177010 A1* | 6/2015 | Abramson | ............ G01C 21/34 |
| | | | 701/400 |
| 2015/0330802 A1 | 11/2015 | Ono | |
| 2017/0274931 A1* | 9/2017 | Yang | .................. G01C 21/3661 |
| 2019/0294181 A1* | 9/2019 | Ohno | .................. G05D 1/0238 |

FOREIGN PATENT DOCUMENTS

| | | |
|---|---|---|
| JP | 2015-217798 A | 12/2015 |
| JP | 2015-219128 A | 12/2015 |

* cited by examiner

*Primary Examiner* — James M McPherson
(74) *Attorney, Agent, or Firm* — Oblon, McClelland, Maier & Neustadt, L.L.P.

(57) ABSTRACT

An autonomous driving apparatus is mounted on a vehicle. The autonomous driving apparatus includes a controller configured to detect that an output timing of route guidance information from a navigation apparatus mounted on the vehicle matches an output timing of route guidance information from the autonomous driving apparatus, acquire an output setting for the route guidance information output from the navigation apparatus, and decide an output setting for the route guidance information output from the autonomous driving apparatus based on the acquired output setting information and the detection.

4 Claims, 4 Drawing Sheets

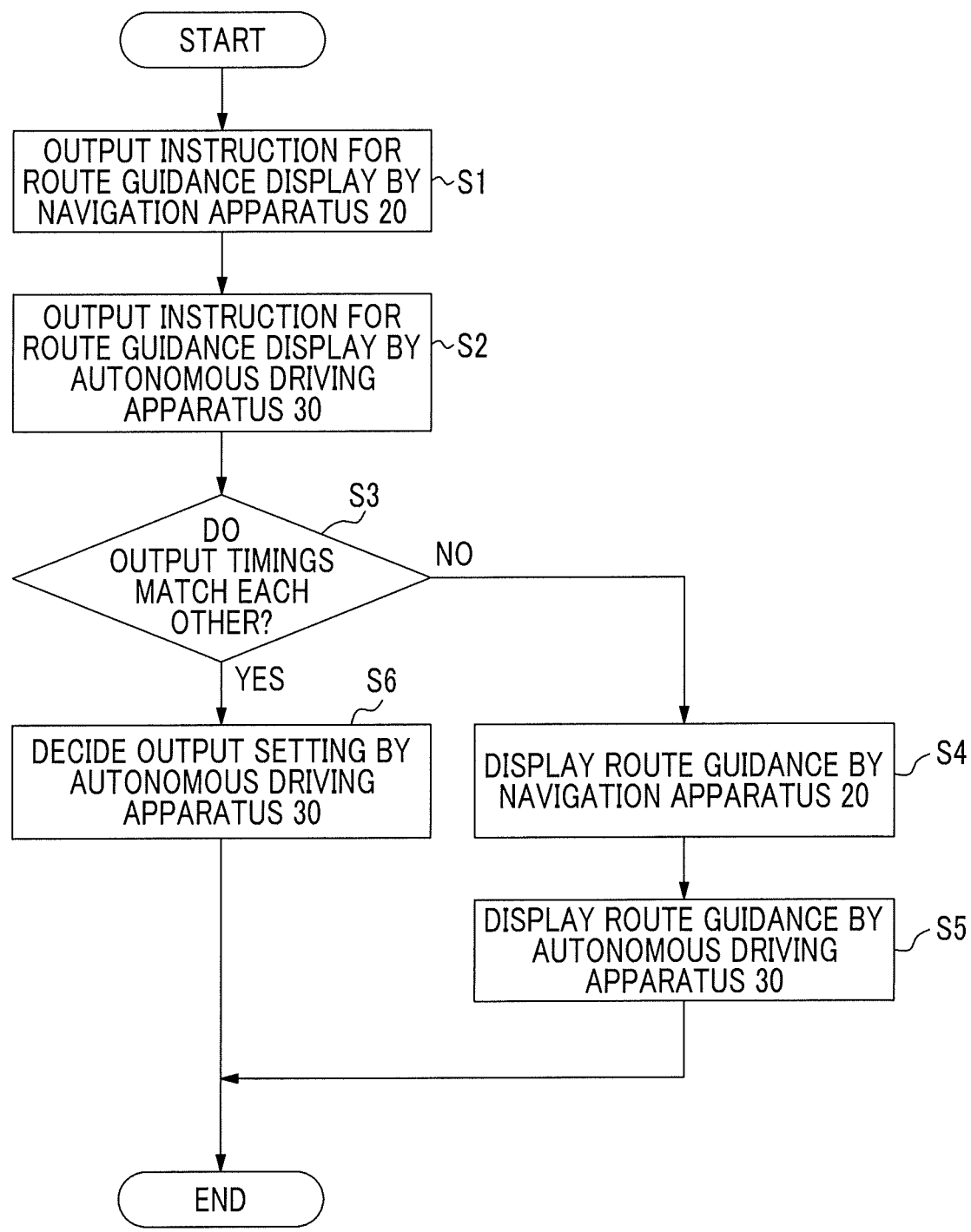

AUTONOMOUS DRIVING APPARATUS AND NAVIGATION APPARATUS

INCORPORATION BY REFERENCE

The disclosure of Japanese Patent Application No. 2018-214084 filed on Nov. 14, 2018 including the specification, drawings and abstract is incorporated herein by reference in its entirety.

BACKGROUND

1. Technical Field

The present disclosure relates to an autonomous driving apparatus and a navigation apparatus.

2. Description of Related Art

In recent years, there has been the improvement in an autonomous driving technique of causing a vehicle to travel regardless of a driver's driving operation by controlling a steering wheel (steering), an accelerator (acceleration), and a brake (braking) while recognizing peripheral statuses of the vehicle.

Japanese Unexamined Patent Application Publication No. 2015-219128 (JP 2015-219128 A) discloses a navigation apparatus configured not to output route guidance from the navigation apparatus during traveling in an autonomous driving mode of a vehicle.

Japanese Unexamined Patent Application Publication No. 2015-217798 (JP 2015-217798 A) discloses an on-vehicle information display control apparatus that can switch between an autonomous driving mode and a manual driving mode, in which television information is displayed on a head up display (HUD) displayed for a driver on a driver's seat during the autonomous driving mode.

SUMMARY

As disclosed in JP 2015-219128 A and JP 2015-217798 A, in a case where display of information from the navigation apparatus is interrupted during autonomous driving, when a vehicle is traveling in the autonomous driving level 2, an autonomous driving mode needing route guidance from the navigation apparatus cannot be sufficiently coped with.

However, route guidance information from the navigation apparatus and route guidance information from the autonomous driving apparatus may conflict with each other. For example, in a case where a vehicle temporarily changes lanes to a left lane, then changes lanes to a right lane, and is advancing toward a right branch road, the navigation apparatus may perform route guidance for prompting a driver to advance toward the right branch road, but the autonomous driving apparatus may perform route guidance for changing lanes to the left lane. Such seemingly contradictory route guidance display may cause the driver to be misunderstood, and thus is not desirable.

Therefore, the present disclosure provides an autonomous driving apparatus and a navigation apparatus capable of outputting route guidance information from the navigation apparatus and route guidance information from the autonomous driving apparatus not to conflict with each other.

A first aspect of the present disclosure relates to an autonomous driving apparatus to be mounted on a vehicle. The autonomous driving apparatus includes a controller configured to detect that an output timing of route guidance information from a navigation apparatus mounted on the vehicle matches an output timing of route guidance information from the autonomous driving apparatus, acquire output setting information for the route guidance information output from the navigation apparatus, and decide output setting information for the route guidance information output from the autonomous driving apparatus based on the acquired output setting information and the detection.

The output setting information includes information for selecting an output device such as a display or a speaker, and information for selecting an output target such as an image, text, a voice, or a sound effect to be output from the output device.

In the autonomous driving apparatus according to the first aspect, the controller may be configured to detect that both of the output timings match each other in a case where a time difference between the output timing of the route guidance information from the navigation apparatus and the output timing of the route guidance information from the autonomous driving apparatus is within a predetermined time.

In the autonomous driving apparatus according to the first aspect, the output setting information may include information for designating a first setting for displaying the route guidance information as an image, information for designating a second setting for displaying the route guidance information as text, information for designating a third setting for outputting the route guidance information as a voice, and information for designating a fourth setting for outputting the route guidance information as a sound effect; and the controller may be configured to decide the output setting information regarding the first to fourth settings for the route guidance information from the autonomous driving apparatus to be different from output setting information regarding the first to fourth settings for the route guidance information from the navigation apparatus.

A second aspect of the present disclosure relates to a navigation apparatus to be mounted on a vehicle. The navigation apparatus includes a controller configured to detect that an output timing of route guidance information from an autonomous driving apparatus mounted on the vehicle matches an output timing of route guidance information from the navigation apparatus, acquire output setting information for the route guidance information output from the autonomous driving apparatus, and decide output setting information for the route guidance information output from the navigation apparatus based on the acquired output setting information and the detection.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a flowchart illustrating a method of outputting route guidance information based on the on-vehicle system 10;

DETAILED DESCRIPTION OF EMBODIMENTS

Hereinafter, an embodiment of the present disclosure will be described with reference to the drawings. The following embodiment is an example for description of the present disclosure, and it is not intended to limit the present disclosure to the embodiment.

Figure 1:
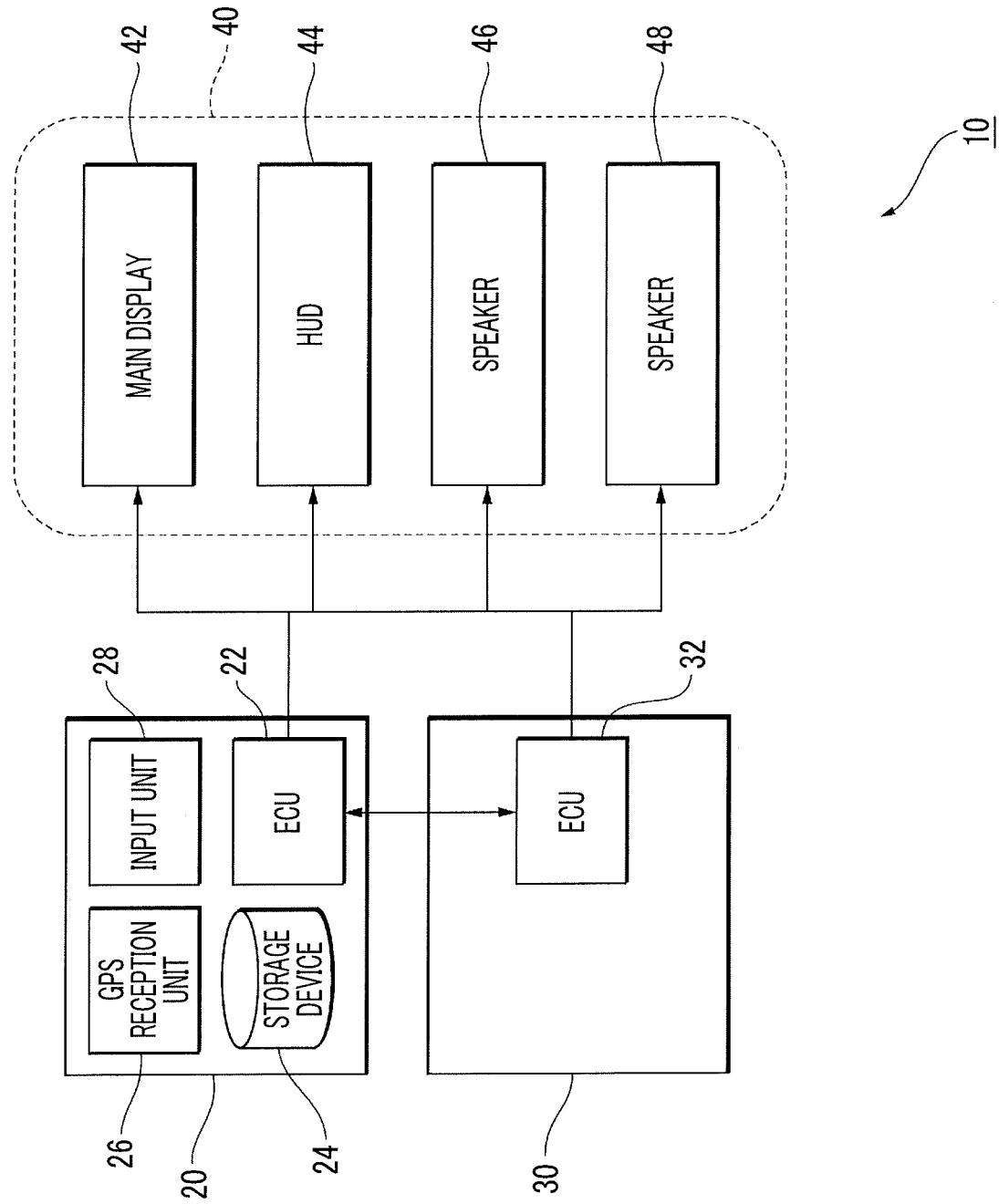
FIG. 1 is a block diagram illustrating an on-vehicle system 10.

FIG. 1 is a block diagram illustrating an on-vehicle system 10 according to the present embodiment. The on-vehicle system 10 includes a navigation apparatus 20, an autonomous driving apparatus 30, and information output means 40.

The navigation apparatus 20 includes a storage device 24, a GPS reception unit 26, an input unit 28, and an electronic control unit (ECU) 22. The navigation apparatus 20 receives a route for reaching a destination that is input from the input unit 28 based on current position information received from the GPS reception unit 26 and map data stored in the storage device 24, and outputs an output instruction signal for outputting route guidance information for causing a vehicle to travel along the route, to the information output means 40. The output instruction signal includes output setting information. Specifically, the output setting information includes, a first setting for displaying the route guidance information as images, a second setting for displaying the route guidance information as text, a third setting for outputting the route guidance information as voices, and a fourth setting for outputting the route guidance information as sound effects. The output setting information includes information for designating at least one of the first to fourth settings.

The storage device 24 is configured with an information storage device such as an HDD or an SSD storing the map data. The map data includes position information of a specific location called a node such as a facility, an address, or an intersection of a road, and information corresponding to a road, called a link, connecting nodes to each other. The position information is indicated by, for example, latitude, longitude, and altitude.

The GPS reception unit 26 acquires position information of a vehicle by receiving a signal from a GPS satellite. The position information is indicated by, for example, latitude, longitude, and altitude.

The input unit 28 is means for a driver of a vehicle inputting a destination or the like, and is configured with, for example, a touch panel mounted on the main display 42. The input unit 28 may include a microphone used to input a destination uttered by a driver or the like.

The ECU 22 retrieves a route from a departure place based on position information received from the GPS reception unit 26 to a destination that is input from the input unit 28 by referring to the map data stored in the storage device 24, and records set route information in a cache storage device (not illustrated). The route information includes information regarding a plurality of links connecting nodes to each other from the departure place to the destination.

The ECU 22 transmits an output instruction signal for outputting route guidance information for guiding the route to the destination to the information output means 40 based on the current position information of a vehicle acquired by using the GPS reception unit 26 during traveling of the vehicle and the set route information. As described above, the output instruction signal includes output setting information, and may cause predetermined output means to output a predetermined type of route guidance information. For example, an output instruction signal including output setting information causing the main display 42 to output image information and the speaker 46 to output voices may be transmitted to the information output means 40.

The autonomous driving apparatus 30 includes an ECU 32. The ECU 32 recognizes surrounding environments (for example, peripheral vehicles, pedestrians, white lines for partitioning lanes of a road, and traffic signals) that dynamically change based on information acquired from on-vehicle sensors such as Laser Imaging Detection and Ranging (LiDAR), millimeter-wave radar, and an imaging device such as a camera, and acquires position information with higher accuracy than that of position information of the vehicle acquired by the GPS reception unit 26 of the navigation apparatus 20, and a vehicle pose. A traveling route plan (lane plan) including lane changes is set based on the acquired surrounding environments and position information of the vehicle. The position information includes pieces of information for respectively specifying a link on which the vehicle is currently located, a lane on which the vehicle is currently located, a relative position on a lane on which the vehicle is currently located, and a three-dimensional position where the vehicle is currently located.

The ECU 32 transmits an output instruction signal for outputting route guidance information based on the lane plan to the information output means 40 according to a flowchart illustrated in FIG. 3 which will be described later. As described above, the output instruction signal includes the output setting information.

The ECU 32 may be configured to generate control data for controlling a steering wheel, an accelerator, and a brake based on the set lane plan, and to output the control data to each actuator.

The ECU 32 is provided with a recording medium (not illustrated) such as a flash memory storing a route plan algorithm for the lane plan and other computer programs, and is configured to execute various calculation processes by hardware such as a processor processing the computer programs. The autonomous driving apparatus 30 may be provided with a separate storage device, and may be provided with a storage device common to the navigation apparatus 20 so as to share part or the whole of the map data.

The information output means 40 includes a main display 42 and a head up display (HUD) 44 displaying images and text, and two speakers 46, 48 outputting voices and sound effects. The information output means 40 may further include a process that controls each output device (the main display 42, the HUD 44, and the speakers 46, 48) based on a received output instruction signal. The information output means 40 may be configured to be further provided with a storage device storing output target data (image data, voice data, and sound effect data), so as to read and output data that is instructed to be output, based on an output instruction signal received from the navigation apparatus 20 or the autonomous driving apparatus 30, and may be configured to receive the data from the navigation apparatus 20 or the autonomous driving apparatus 30.

Figure 2:
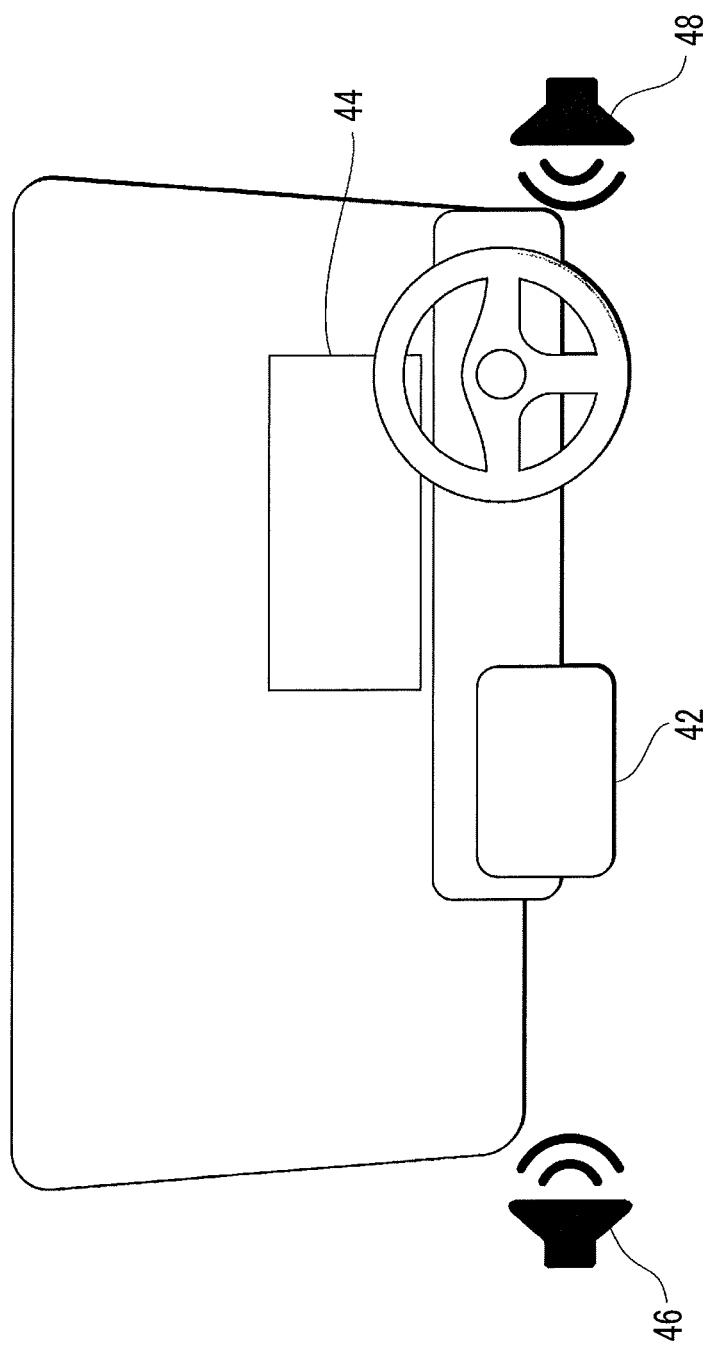
FIG. 2 is a schematic diagram illustrating an example in which a main display 42, a HUD 44, and speakers 46, 48 of the on-vehicle system 10 are disposed in a vehicle.

FIG. 2 illustrates an example in which the information output means 40 is disposed in the vehicle. The main display 42 is a display device such as a liquid crystal display provided on a dashboard. A driver and other passengers can view images and text displayed on the main display 42. The HUD 44 is a projection type display device that reflects a video projected from a projection source at a windshield, and allows the driver to visually recognize the video as a virtual image. The speakers 48, 46 are respectively provided on the right and left sides at the front portion of the vehicle.

Hereinafter, with reference to a flowchart of FIG. 3, a description will be made of a method of outputting route guidance information according to the present embodiment when a vehicle mounted with the autonomous driving apparatus 30 is subjected to autonomous driving in the autonomous driving level 2.

Here, a description will be made of an example of an autonomous driving level of an autonomous driving mode defined by the NHTSA or the like.

Autonomous Driving Level 1 (Driving Assistance)

The autonomous driving level 1 indicates a driving mode in which the autonomous driving apparatus can control any one of a steering wheel (steering), an accelerator (acceleration), and a brake (braking). A driver needs to operate the vehicle.

Autonomous Driving Level 2 (Partial Autonomous Driving)

The autonomous driving level 2 indicates a driving mode in which the autonomous driving apparatus can simultaneously execute a plurality of operations using the steering wheel, the accelerator, and the brake. In the autonomous driving level 2, the autonomous driving apparatus controls the steering wheel or a vehicle speed based on information acquired from the periphery (including a road surface and other vehicles) of the vehicle by using various sensors mounted on the vehicle. The driver needs to operate the vehicle in an emergency or the like.

Autonomous Driving Level 3 (Conditional Autonomous Driving)

The autonomous driving level 3 indicates a driving mode in which the autonomous driving apparatus can simultaneously execute all of operations using the steering wheel, the accelerator, and the brake. In the autonomous driving level 3, the autonomous driving apparatus fully autonomously performs driving of the vehicle based on various pieces of information that can be acquired from sensors and communication means. The driver needs to operate the vehicle in an emergency or the like.

Therefore, in the autonomous driving level 2, desirably, the driver receives route guidance from the navigation apparatus 20 while causing the autonomous driving apparatus 30 to execute autonomous driving, and can operate the vehicle as needed.

In step S1 in FIG. 3, the ECU 22 of the navigation apparatus 20 performs route guidance based on route information including information regarding a plurality of links connecting nodes to each other from a departure place to a destination. For example, when the vehicle comes close to a location where route guidance is needed, such as a case where the vehicle advances to a right branch road, an output instruction signal for outputting route guidance information is transmitted to the information output means 40.

In step S2, the ECU 32 of the autonomous driving apparatus 30 performs route guidance based on route information including a lane plan. For example, when the vehicle comes close to a location where route guidance is needed, such as a case where road construction is being performed in a lane where the vehicle is traveling and a right lane on a three-lane road, and thus the vehicle is needed to change lanes to a left lane, an output instruction signal for outputting route guidance information is transmitted to the information output means 40.

Here, route information set by the navigation apparatus 20 is provided in the link unit connecting nodes such as intersections to each other. On the other hand, route information set by the autonomous driving apparatus 30 includes information for specifying a plurality of lanes that may be present on a single link. The route information includes route information in the unit called a path shorter than a link. Thus, the route information set by the autonomous driving apparatus 30 may have a resolution higher than that of the route information set by the navigation apparatus 20. Whereas the route information set by the navigation apparatus 20 is static as a principle, the route information set by the autonomous driving apparatus 30 dynamically changes depending on surrounding environments such as other vehicles.

Step S1 and step S2 may be configured to be executed in parallel to each other, or step S2 may be configured to be executed prior to step S1.

In the on-vehicle system 10 of the present embodiment, the ECU 22 and the ECU 32 are configured to perform communication with each other. In step S3, the ECU 32 receives the output instruction signal output from the ECU 22, and determines whether or not an output timing in the information output means 40 based on the output instruction signal and an output timing in the information output means 40 based on an output signal transmitted from the ECU 32 match each other.

Various pieces of determination means may be employed. For example, time information indicating an output timing in the information output means 40 may be included in the output instruction signal, and, in a case where a time different from between the output timings is within a predetermined time, it may be determined that the output timings match each other. Alternatively, it may be determined whether or not the output timings match each other by comparing a count value at the time at which the ECU 32 is needed to perform route guidance with a threshold value by using a counter that starts counting at the time of receiving the output instruction signal from the ECU 22.

In a case where the output timing based on the output instruction signal from the navigation apparatus 20 does not match the output timing based on the output instruction signal from the autonomous driving apparatus 30 in step S3, the information output means 40 outputs route guidance information based on the output instruction signal from the navigation apparatus 20 in step S4. For example, in a case where the vehicle advances to a right branch road, the output instruction signal including a setting for displaying an image indicating that the vehicle advances to the right branch road on the main display 42 and a setting for outputting voices for prompting the vehicle to advance to the right branch road from the speaker 48 on the driver side is transmitted from the navigation apparatus 20 to the information output means 40. As mentioned above, output setting information corresponding to an instruction content is predefined such that the instruction content is appropriately delivered to a driver.

Similarly, in step S5, the information output means 40 outputs the route guidance information based on the output instruction signal from the autonomous driving apparatus 30. For example, in a case where the vehicle is needed to change lanes to a left lane since road construction is being performed in a three-lane road, the output instruction signal including a setting (first setting) for displaying an image indicating that the vehicle changes lanes to the left lane on the main display 42 and a setting (third setting) for outputting voices for explaining that the vehicle changes lanes to the left lane from the speaker 48 on the driver's seat side is transmitted from the autonomous driving apparatus 30 to the information output means 40. Step S5 may be configured to be executed prior to step S4.

In a case where the output timing based on the output instruction signal from the navigation apparatus 20 matches the output timing based on the output instruction signal from the autonomous driving apparatus 30 in step S3, the ECU 32 decides an output setting of information output from the autonomous driving apparatus 30 based on an output setting of information output from the navigation apparatus 20 in step S6.

There is a plurality of aspects of a method of deciding an output setting in the autonomous driving apparatus 30, and any aspect may be used.

Aspect 1

In Aspect 1, the ECU 32 decides output setting information such that route guidance information is output from an output device that is different from an output device defined in output setting information from the ECU 22. For example, in a case where image display using the main display 42 and voice output using the speaker 48 are set in output setting information from the ECU 22, originally, image display using the main display 42 and voice output using the speaker 48 are also set in output setting information from the ECU 32, but the output setting information is decided such that output (for example, displaying text indicating that the vehicle is moved to the left lane on the HUD 44) is performed by using a separate output device.

With this configuration, even in a case where two pieces of route guidance information may conflict with each other since route guidance information output from the navigation apparatus 20 prompts a vehicle to advance to the right, and route guidance information output from the autonomous driving apparatus 30 indicates that the vehicle advances to the left, a driver or the like can separately recognize both of the pieces of route guidance information. Thus, the driver or the like can understand the two pieces of route guidance information without being contradictory.

In step S6, the ECU 32 may decide an output setting as output setting information from the autonomous driving apparatus 30 such that the two speakers 46, 48 are used. For example, in a case where a vehicle changes lanes to a left lane, there may be an output setting such that sound effects are generated from the right speaker 48, and then sound effects are generated from the left speaker 46 with a slight time interval. The driver or the like can understand by feeling that the vehicle changes lanes to the left lane. Outputs are performed in different forms such that image display and a sound output are performed based on an output instruction signal from the navigation apparatus 20, and a sound effect is output based on an output instruction signal from the autonomous driving apparatus 30, and thus the driver or the like can clearly separately recognize both of the two.

Aspect 2

In Aspect 2, the ECU 32 decides output setting information based on information for selecting images, text, voices, and sound effects to be output, defined in output setting information included in an output instruction signal from the ECU 22.

For example, in a case where an image for prompting a vehicle to advance to a right branch road is set in output setting information from the ECU 22, and an image for changing lanes to a left lane is to be displayed in output setting information from the ECU 32, output setting information is decided such that images and voices for temporarily changing lanes to the left lane and then prompting the vehicle to advance to the right branch road are displayed and output as output targets.

Specifically, combinations of output targets having a conflict relationship may be stored in advance based on pieces of identification information for specifying output targets such as images and voices designated in output setting information, and, in this case, the ECU 32 may decide output setting information such that images expressed not to cause conflict are displayed as output targets. On the other hand, output targets having no conflict relationship may be output without being changed.

Figure 4A:
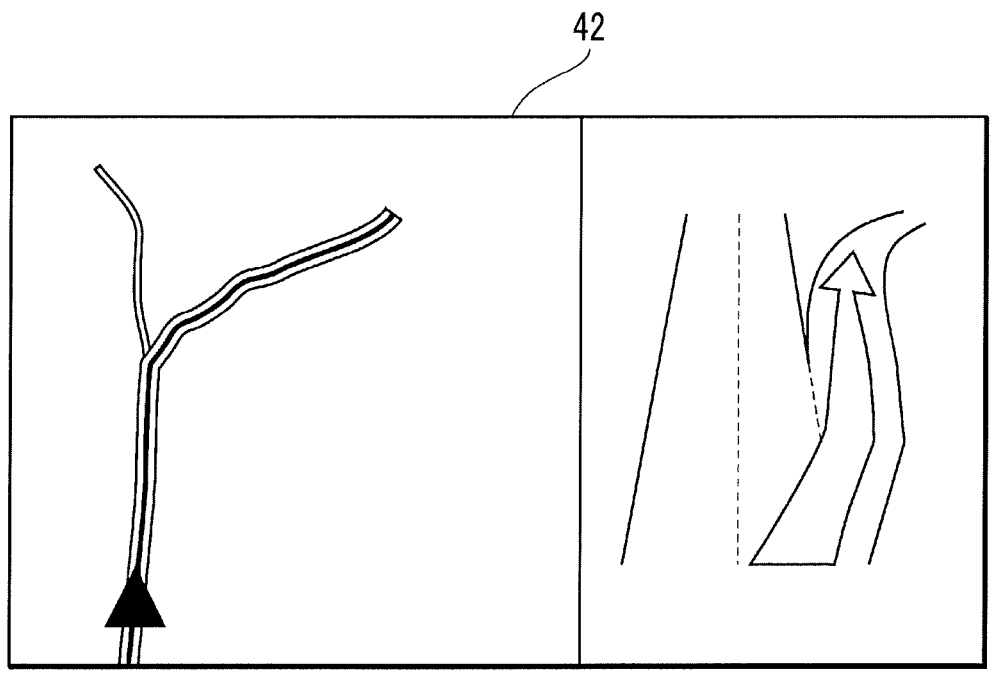
FIG. 4A illustrates an example of route guidance display performed by a navigation apparatus 20.
Figure 4B:
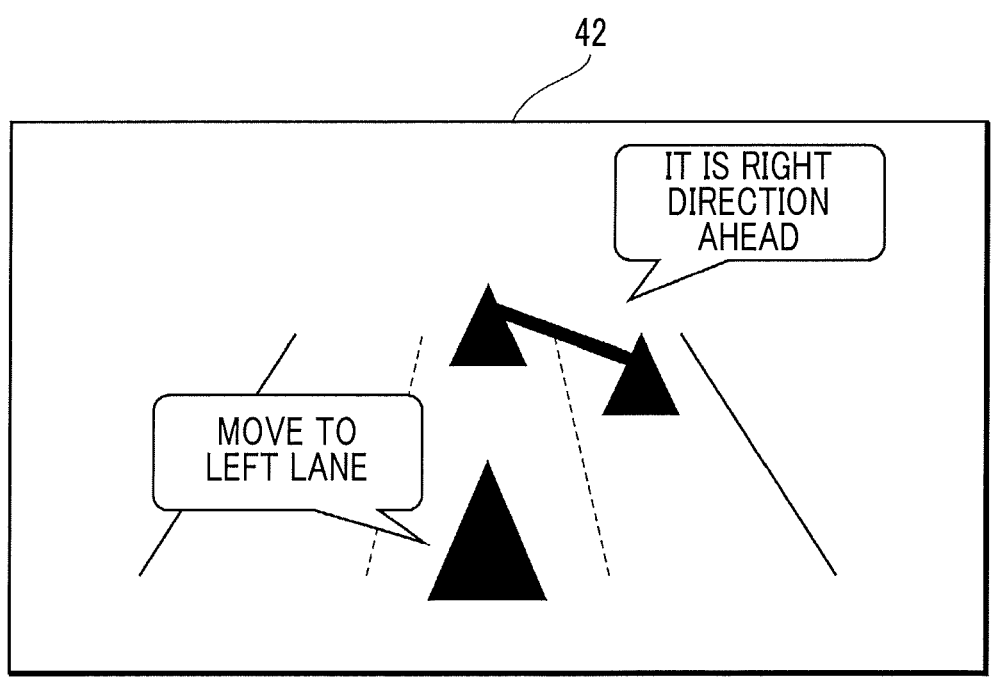
FIG. 4B illustrates an example of route guidance display performed by an autonomous driving apparatus 30.

FIG. 4A illustrates a scene in which an image for prompting a vehicle to advance to a right branch road is displayed on the main display 42 as route guidance display performed by the navigation apparatus 20. FIG. 4B illustrates a scene in which an image for prompting a vehicle to temporarily change lanes to the left lane and then to advance to the right branch road is displayed on the main display 42 as route guidance display performed by the autonomous driving apparatus 30.

The driver or the like views the image illustrated in FIG. 4B, and can thus understand that the vehicle temporarily changes lanes to the left lane and then advances to the right branch road.

The image illustrated in FIG. 4A may be displayed on the main display 42, and the image illustrated in FIG. 4B may be displayed on the HUD 44. The image illustrated in FIG. 4A may be displayed on the main display 42, and then switch to the image illustrated in FIG. 4B. The ECU 32 may decide output setting information for outputting that "the vehicle temporarily changes lanes to the left lane and then advances to the right branch road" with voices with respect to route guidance performed by the autonomous driving apparatus 30, in a state in which the image illustrated in FIG. 4A is maintained to be displayed on the main display 42. The ECU 32 may decide output setting information for outputting text display having the content that "the vehicle temporarily changes lanes to the left lane and then advances to the right branch road" on the HUD 44. The autonomous driving apparatus 30 may be prohibited to perform route guidance depending on output targets.

As described above, the autonomous driving apparatus 30 includes at least the ECU 32 that decides an output setting (information for selecting an output device or information for selecting an output target) for route guidance information output from the navigation apparatus 20 when an output timing of the route guidance information from the navigation apparatus 20 matches an output timing of route guidance information from the autonomous driving apparatus 30, and can thus output the route guidance information from the navigation apparatus 20 and the route guidance information from the autonomous driving apparatus 30 not to conflict with each other.

The present disclosure is applicable to cases of other autonomous driving levels.

The navigation apparatus 20 may be made to have an identical function. Specifically, there may be a configuration in which the ECU 22 detects that an output timing of route guidance information from the navigation apparatus 20 matches an output timing of route guidance information from the autonomous driving apparatus 30, acquires an output setting for the route guidance information output from the autonomous driving apparatus 30, and decides an output setting for the route guidance information output from the navigation apparatus 20 based on the acquired output setting.

The present disclosure may be variously modified without departing from the spirit thereof. For example, some constituent elements in a certain embodiment may be deleted or replaced with other constituent elements within the ordinary creative ability of a person skilled in the art.

What is claimed is:

1. An autonomous driving apparatus to be mounted on a vehicle, the autonomous driving apparatus comprising:
a controller configured to:
- detect, based on a predetermined condition, that a first output timing of route guidance information from a navigation apparatus mounted on the vehicle matches a second output timing of route guidance information from the autonomous driving apparatus,
- acquire, from the navigation apparatus, output setting information for the route guidance information output, the output setting information including (i) information for designating a first setting for displaying the route guidance information as an image, (ii) information for designating a second setting for displaying the route guidance information as text, (iii) information for designating a third setting for outputting the route guidance information as a voice, and (iv) information for designating a fourth setting for outputting the route guidance information as a sound effect, and
- decide output setting information for the route guidance information output from the autonomous driving apparatus based on the acquired output setting information and the detection, the controller being configured to decide the output setting information regarding the first to fourth settings for the route guidance information from the autonomous driving apparatus to be different from output setting information regarding the first to fourth settings for the route guidance information from the navigation apparatus,
- generate an output instruction signal in accordance with the decided output setting information, and
- output, to an output device of the vehicle, the output instruction signal.

2. The autonomous driving apparatus according to claim 1, wherein the predetermined condition specifies that a time difference between the first output timing of the route guidance information from the navigation apparatus and the second output timing of the route guidance information from the autonomous driving apparatus is within a predetermined time.

3. The autonomous driving apparatus according to claim 1, wherein the controller is configured to decide the output setting information for the route guidance information from the autonomous driving apparatus to the fourth setting in a case where the output setting information for the route guidance information from the navigation apparatus is the first setting.

4. A navigation apparatus to be mounted on a vehicle, the navigation apparatus comprising:
a controller configured to:
- detect, based on predetermined condition, that a first output timing of route guidance information from an autonomous driving apparatus mounted on the vehicle matches a second output timing of route guidance information from the navigation apparatus,
- acquire, from the autonomous driving apparatus, output setting information for the route guidance information output, the output setting information including (i) information for designating a first setting for displaying the route guidance information as an image, (ii) information for designating a second setting for displaying the route guidance information as text, (iii) information for designating a third setting for outputting the route guidance information as a voice, and (iv) information for designating a fourth setting for outputting the route guidance information as a sound effect,
- decide output setting information for the route guidance information output from the navigation apparatus based on the acquired output setting information and the detection, the controller being configured to decide the output setting information regarding the first to fourth settings for the route guidance information from the autonomous driving apparatus to be different from output setting information regarding the first to fourth settings for the route guidance information from the navigation apparatus,
- generate an output instruction signal in accordance with the decided output setting information, and
- output, to an output device of the vehicle, the output instruction signal.

* * * * *